United States Patent
Tsuo

[11] Patent Number: 5,696,427
[45] Date of Patent: Dec. 9, 1997

[54] ADJUSTABLE RETAINER FOR DEGAUSSING COIL

[75] Inventor: Chun-Jung Tsuo, Taoyuan, Taiwan

[73] Assignee: Acer Peripherals, Inc., Taiwan

[21] Appl. No.: 667,900

[22] Filed: Jun. 20, 1996

[51] Int. Cl.$^6$ ............................................. F16L 3/08
[52] U.S. Cl. .................. 315/8; 348/825; 361/150; 248/74.3; 24/16 PB; 24/17 AP
[58] Field of Search .............................. 335/210, 212; 315/8; 248/74.3; 24/16 PB, 17 AP; 361/150; 348/821, 825

[56] References Cited

U.S. PATENT DOCUMENTS 5,416,595   5/1995   Wield ........................... 348/82.5

Primary Examiner—Robert Pascal
Assistant Examiner—Arnold Kinkead

[57] ABSTRACT

The strip-type retainer device for fitting a degaussing coil of a cathode ray tube in a display device is provided. The retainer device comprises a first end section, a contact section, a middle section and a second end section. The contact section has a plurality of positioning slots. The middle section has a first passage allowing passage of the first end section. The first passage defines a periphery around the passage. A latch is provided on the periphery of the first passage to cooperate with one of a plurality of positioning slots. A second end section has a second passage allowing passage of the lug. The retainer device is removably attached to the peripheral edge of the cathode ray tube. The first end section passes through the first passage and the degaussing coil contacts with the funnel-shape surface of the cathode ray tube tightly by selecting an appropriate positioning slot to cooperate with the latch.

4 Claims, 2 Drawing Sheets

ADJUSTABLE RETAINER FOR DEGAUSSING COIL

TECHNICAL FIELD OF INVENTION

The invention relates to an adjustable retainer which retains the degaussing coil to the cathode ray tube.

BACKGROUND OF INVENTION

As is well known in the art, the monitor or other display device, for example, television set, mainly includes a cathode ray tube (CRT) and other circuitry formed on a circuit board within a monitor casing. In particular, a bezel is provided adjacent to and cover the front side of the cathode ray tube that is housed within the casing.

It is well known that a degaussing coil is provided around the periphery of the funnel-shape CRT to minimize the electro-magnetic waves generated due to the operation of the CRT. The prior art relating to the degaussing coil attachment includes U.S. Pat. Nos. 5,038,078 and 4,700,260. The prior art relating to the adjustable length strip fastener includes U.S. Pat. No. 4,150,463. In short, U.S. Pat. No. 5,038,078 discloses a spring that includes a resilient body forming a spring action that snugly fits the degaussing coil against the outer conductive coating. The spring includes a clip for attaching the resilient body to the degaussing coil. At least one of the clip and the resilient body is made of an insulated material to prevent the resilient body from providing a conductive path and electrical shock hazard between the degaussing coil and the electrically isolated outer conductive coating.

The prior art dress clip device used to clip the degaussing coil sometimes does not make the required closed contact between the degaussing coil and the surface of the CRT due to the dimensional variations of either the CRT or degaussing coil. When this unexpected situation does occur, looseness of the connection of the degaussing coil may occur and the purpose of providing the degaussing coil may not be attained.

It is therefore the main purpose of the invention to provide a retainer by which the closed contact of the degaussing coil to the funnel surface of a CRT is made possible despite the dimensional variations.

SUMMARY OF INVENTION

The strip-type retainer device for a degaussing coil of a cathode ray tube in a display device is provided. The retainer device comprises a first end section, a contact section, a middle section and a second end section. In a preferred embodiment, the semi-rigid material used for making the retainer device is NYLON 66.

The contact section has a plurality of positioning slots. The middle section has a first passage allowing passage of the first end section. The first passage defines a periphery around the passage. A latch is provided on the periphery of the first passage to cooperate with one of the plurality of positioning slots. The second end section has a second passage allowing passage of the lug. The retainer device is removably attached to the peripheral edge of the cathode ray tube. The first end section passes through the first passage and the degaussing coil gets in contacts with the funnel-shaped surface of the cathode ray tube tightly by selecting an appropriate positioning slots to cooperate with the latch.

DETAILED DESCRIPTION OF THE PREFERRED EMBODIMENT

Figure 1:
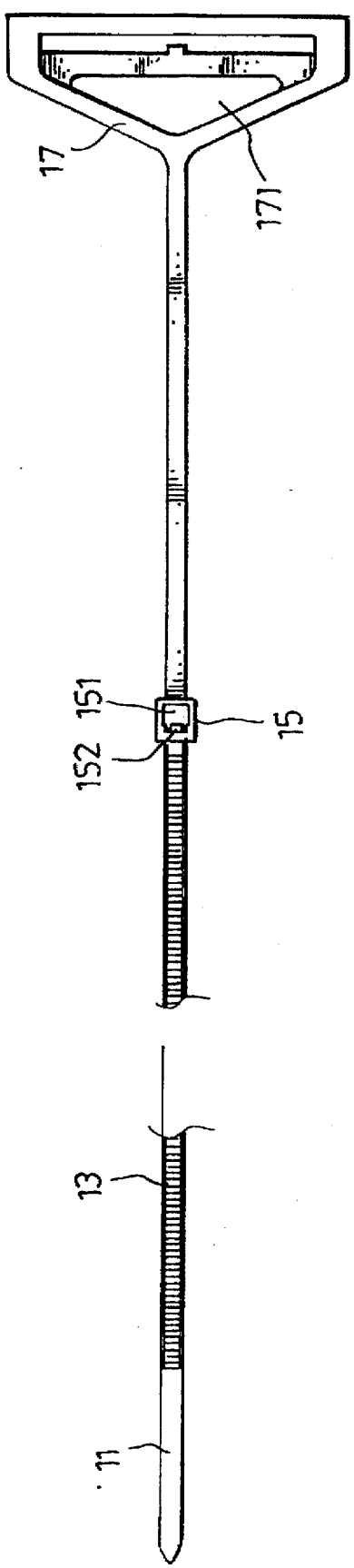
FIG. 1 discloses the adjustable retainer in accordance with the invention.
Figure 2:
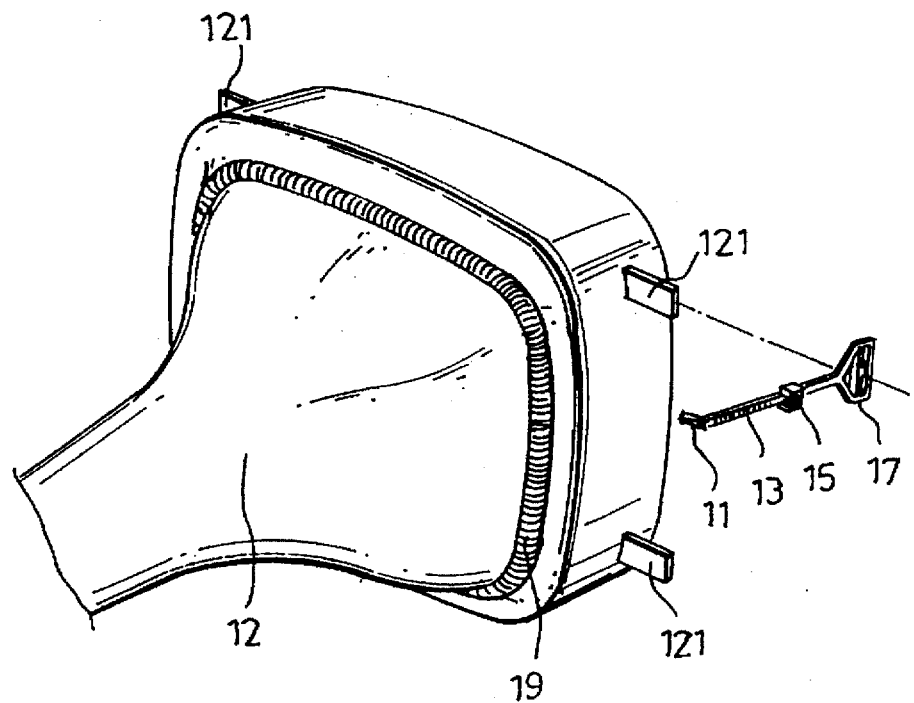
FIG. 2 discloses how the degaussing coil is closely attached to the CRT by the retainer of the invention.
Figure 3:
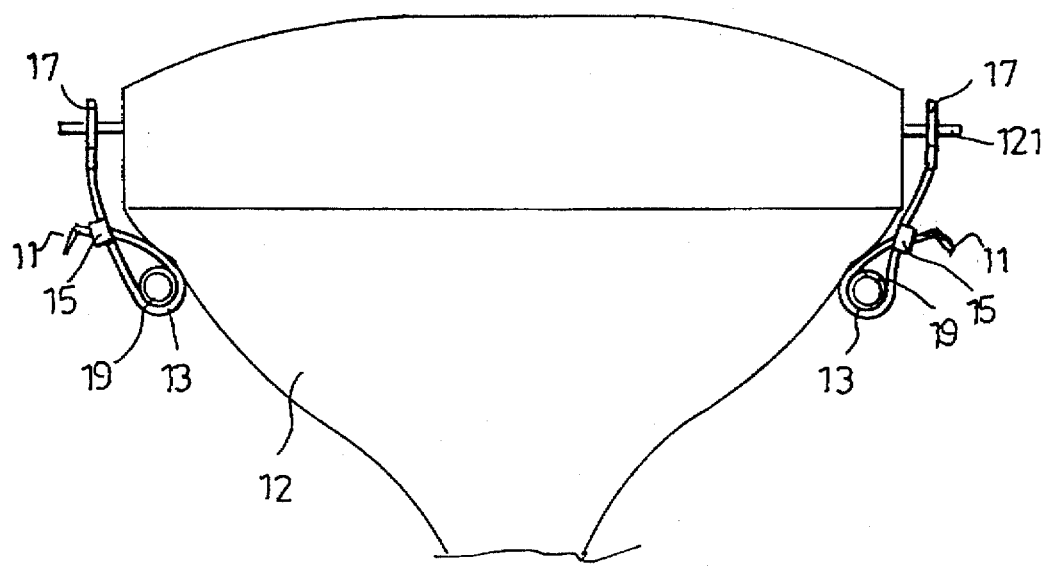
FIG. 3 shows one sectional view of FIG. 2.

As shown in FIG. 1, the strip-type retainer device for a degaussing coil of a cathode ray tube in a display device comprises a first end section 11, a contact section 13, a middle section 15 and a second end section 17. In the preferred embodiment, the semi-rigid material for making the retainer device is NYLON 66. As shown, the contact section 13 has a plurality of positioning slots. The middle section 15 has a first passage 151 allowing passage of the first end section 11. The first passage 151 defines a periphery around the passage. A latch 152 is provided on the periphery of the first passage 151 to cooperate with one of the plurality of positioning slots. The second end section 17 has a second passage 171 allowing passage of a lug 121 shown in FIG. 2. The retainer device is removably attached to the peripheral edge of the cathode ray tube. The first end section 11 passes through the first passage 151 and the degaussing coil 19 contacts with the funnel-shaped surface of the cathode ray tube tightly by selecting an appropriate positioning slot to cooperate with the latch 152, as shown in FIG. 2. The second passage 171 is penetrated by the lug 121 and therefore the first end section 11 of the retainer is attached to the CRT. The contact section 13 contacts with a semi-circular portion of the degaussing coil 19 as shown and the end section 11 passes through the first section 151. One slot is selected to cooperate with the latch 152 such that the required contact relationship is sustained, as shown in FIG. 3.

Clearly it is easier to assemble the retainer of the present invention with the CRT or dissemble it from the CRT than in the prior art arts when need arises. Furthermore, the arrangement makes the closed contact of the degaussing coil to the funnel surface of the CRT more reliable. The adjustable feature of the retainer also makes the adjustment possible and easier when the dimensional incompatibility between the degaussing coil and a funnel surface of the CRT is substantial.

What is claimed is:

1. A strip-type retainer device for a degaussing coil of a cathode ray tube in a display device, the cathode my tube having a funnel-shaped surface which defines a peripheral edge and having at least a lug around the peripheral edge, the retainer device comprising:

a first end section;

a contact section with a plurality of positioning slots;

a middle section which has a first passage allowing passage of the first end section, the first passage defining a periphery therearound, a latch being provided on said periphery of the first passage to cooperate with one of the plurality of positioning slots; and a second end section which has a second passage allowing passage of said lug, thereby the retainer device is removably attached to the peripheral edge of the cathode ray tube;

wherein the first end section passes through the first passage and the degaussing coil contacts with the funnel-shaped surface of the cathode ray tube tightly by selecting an appropriate one of the positioning slots to cooperate with the latch.

2. The strip-type retainer device as recited in claim 1, wherein the first end section is declined with respect to the contact section to allow easy penetration through the first passage.

3. A cathode ray tube assembly comprising:

a cathode ray tube having a funnel-shaped surface which defines a peripheral edge and having a plurality of lugs disposed around the peripheral edge;

an insulated degaussing coil fitted to the funnel-shaped surface;

a strip-type adjustable retainer for the degaussing coil, the retainer comprising:
- a first end section;
- a contact section with a plurality of positioning slots;
- a middle section which has a first passage allowing passage of the first end section, the first passage defining a periphery therearound, a latch being provided on said periphery of the first passage to cooperate with one of the plurality of positioning slots; and
- a second end section which has a second passage allowing passage of one of the lugs, thereby the retainer device is removably attached to the peripheral edge of the cathode ray tube;

wherein the first end section passes through the first passage and the degaussing coil contacts with the funnel-shaped surface of the cathode ray tube tightly by selecting an appropriate one of the positioning slots to cooperate with the latch.

4. The cathode ray tube assembly as recited in claim 3, wherein the first end section is declined with respect to the contact section to allow easy penetration through the first passage.

* * * * *